United States Patent
Yang

(10) Patent No.: US 7,555,119 B2
(45) Date of Patent: Jun. 30, 2009

(54) DEVICE FOR AUTOMATICALLY LIFTING A COVER OF MOBILE PHONE BY PRESSING

(75) Inventor: Sunney Yang, 1F., No. 34, Yongzhen Rd., Yonghe, Taipei County 234 (TW)

(73) Assignees: Sunney Yang, Taipei (TW); Advanced-Connectek Inc., Taipei (TW)

( * ) Notice: Subject to any disclaimer, the term of this patent is extended or adjusted under 35 U.S.C. 154(b) by 487 days.

(21) Appl. No.: 11/553,777

(22) Filed: Oct. 27, 2006

(65) Prior Publication Data

US 2007/0094843 A1 May 3, 2007

(30) Foreign Application Priority Data

Oct. 28, 2005 (TW) .............................. 94218648 U

(51) Int. Cl.
*H04M 1/00* (2006.01)
*H04M 9/00* (2006.01)

(52) U.S. Cl. ............................ 379/433.11; 379/433.13; 455/575.3

(58) Field of Classification Search ............ 379/433.11, 379/433.13; 455/575.3, 90.3; 16/303, 330, 16/284, 248
See application file for complete search history.

(56) References Cited

U.S. PATENT DOCUMENTS

2004/0181909 A1* 9/2004 Kawamoto ................... 16/330

2005/0204508 A1* 9/2005 Duan et al. .................... 16/303

FOREIGN PATENT DOCUMENTS

TW M273899 8/2006

* cited by examiner

*Primary Examiner*—Tuan D Nguyen

(57) ABSTRACT

A device for automatically lifting a cover of a mobile phone by pressing is to control the lifting/closing operation of an upper cover relative to a main body of a mobile phone. A housing member is connected between the main body and the upper cover. The device for lifting the cover comprises a pressing-and-controlling means provided within the housing member, a braking means accommodated within the pressing-and-controlling means and movably connected to the pressing-and-controlling means, a rotating means operatively connected to the pressing-and-controlling means and the braking means, and a reciprocating means operatively connected to the other end of the rotating means. With the above arrangement, a user can operate the pressing-and-controlling means with single hand to drivingly connect to the braking means and cause the rotating means to rotate and slide, thereby to automatically lift the upper cover of the mobile phone after being pressed. Alternatively, the user can operate the reciprocating means and the rotating means to cause them to rotate and slide so as to manually open/close the upper cover. Therefore, it is convenient for the user to answer a call.

10 Claims, 14 Drawing Sheets

DEVICE FOR AUTOMATICALLY LIFTING A COVER OF MOBILE PHONE BY PRESSING

BACKGROUND OF THE INVENTION

1. Field of the Invention

The present invention relates to a device for automatically lifting a cover of a mobile phone by pressing. In particular, the present invention has double operational modes (manual and automatic) and is provided between a main body and an upper cover of a foldable mobile phone, thereby to rapidly open/close the upper cover. Therefore, it is convenient for a user to use in communication.

2. Description of Prior Art

Currently, a cover-lifting device is provided between a main body and an upper cover of a foldable mobile phone, by which a user can lift the upper cover to answer a call and close the upper cover after finishing the call. The design and operation of a rotating shaft in the above-mentioned device has an influence on the convenience in lifting/closing the upper cover. Therefore, an excellent design in an automatically cover-lifting device will certainly improve the convenience and rapidity in lifting/closing operation of a mobile phone when the user intends to answer a call.

In Taiwan Patent Publication No. M273899 filed by the present applicant and entitled "Automatically cover-lifting device for mobile phone", the characteristic of the patent application lies in that a pressing means, a rotating means and a reciprocating means are provided between a main body and an upper cover of a foldable mobile phone. With such arrangement, the user can operate the pressing means by single hand to push the rotating means, and then drives the reciprocating means to rotate and slide, so that the upper cover of the mobile phone can be rapidly lifted. In this way, it is convenient for the user to operate and answer a call. However, the above structure is too bulky, and thus it has some limitations in use and does not conform to the recent requirements for a compact and light mobile phone.

SUMMARY OF THE INVENTION

The present invention is to provide a device for automatically lifting a cover of a mobile phone by pressing, in which the user can operate to automatically lift the upper cove of the mobile phone by single hand, or manually lift/close the upper cover. Therefore, it is easy for the user to close the upper cover when answering a call.

The present invention provides a device for automatically lifting a cover of a mobile phone by pressing, which can be applied to a mobile phone having an upper cover and a main body and comprises the following components.

A pressing-and-controlling means has a shaft rod and a sliding wheel seat. One end of the sliding wheel seat is formed with a first cam rail.

A braking means has a braking disk connected onto the shaft rod with a predetermined elastic torque therebetween, a braking element sequentially connected onto the shaft rod for axially moving relative to the shaft rod, and a return spring provided between the corresponding end faces of the braking disk and the braking element. The braking disk, the braking element and the return spring are accommodated within the sliding wheel seat. The other end face of the braking element is formed with a second cam rail.

A rotating means comprises a rotating element and a compression spring for abutting against one end face of the rotating element. The rotating element is provided with a third cam rail and a fourth cam rail at an end corresponding to the first cam rail and the second cam rail, respectively. Each of the above cam rails can be operatively connected to one another. The other end of the rotating element is provided with a fifth cam rail.

A reciprocating means has a positioning sleeve connected onto the shaft rod and axially movable relative to the shaft rod and a closing spring abutting against one end face of the positioning sleeve. One end of the positioning sleeve is accommodated into the rotating element, and the periphery of the other end thereof is provided with a wedge. The wedge is operatively connected to the fifth cam rail.

DETAILED DESCRIPTION OF THE INVENTION

Figure 1:
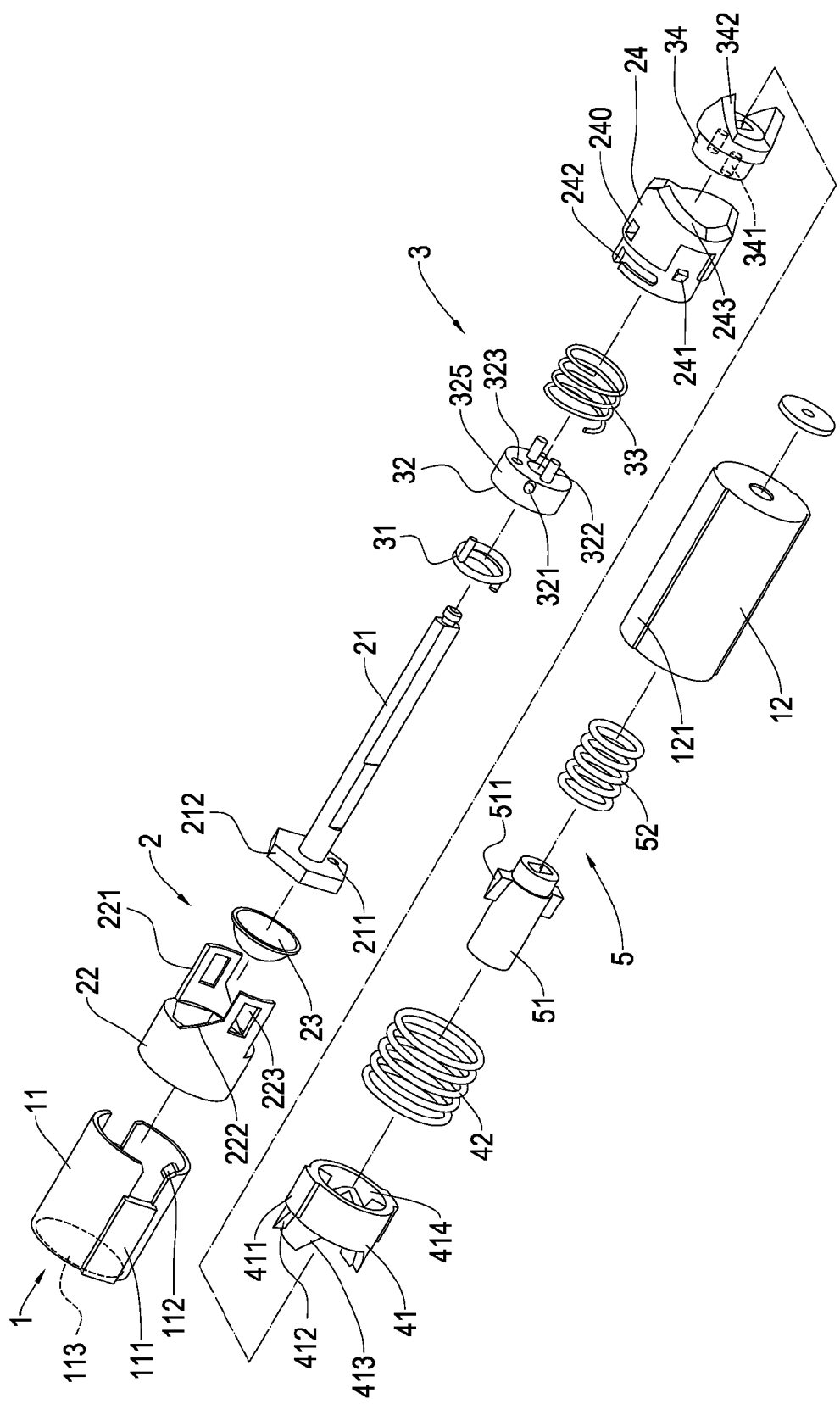
FIG. 1 is an exploded perspective view of the present invention.

The detailed description and the technical contents of the present invention will be made with reference to the accompanying drawings. However, it should be understood that the drawings are illustrative but not used to limit the scope of the present invention.

With reference to FIGS. 1 to 5, the present invention relates to a device for automatically lifting a cover of a mobile phone, wherein the device for lifting the cover is applied to a mobile phone (not shown) having an upper cover and a main body. The upper cover and the main body are provided with corresponding through holes. The through holes allow the insertion and connection of a housing member 1. The device for lifting the cover comprises a pressing-and-controlling means 2 accommodated within the housing member 1, a braking means 3 movably connected with the pressing-and-controlling means, and a rotating means 4 connected by the braking means 3 to produce an automatically rotating action. The rotating means 4 is fixedly connected to the upper cover of the mobile phone via a rotary housing 12. Further, one end of the rotating means 4 is movably connected to a reciprocating means 5 to generate double operation modes (manual or automobile mode). With the above arrangement, the upper cover of the mobile phone can be rapidly lifted, so that it is convenient for the user to answer a call.

The housing member 1 comprises a fixed housing 11 and a rotary housing 12. The outer peripheral wall of the fixed housing 11 is provided with two planar positioning portions 111 corresponding to each other. The peripheral wall of the rotary housing 12 is formed with positioning portions 121 that protrude outwardly and recessed inwardly. The positioning portions 111, 121 can be a flange, trough (not shown) or other means for restricting the rotation, thereby to connect with the main body and upper cover (not shown), respectively. The inner wall of the fixed housing 11 is provided with at least one positioning block 112. The outer peripheral surface of the sliding wheel seat 24 of the pressing-and-controlling means 2 is provided with locking troughs 240 for locking connection.

Figure 2:
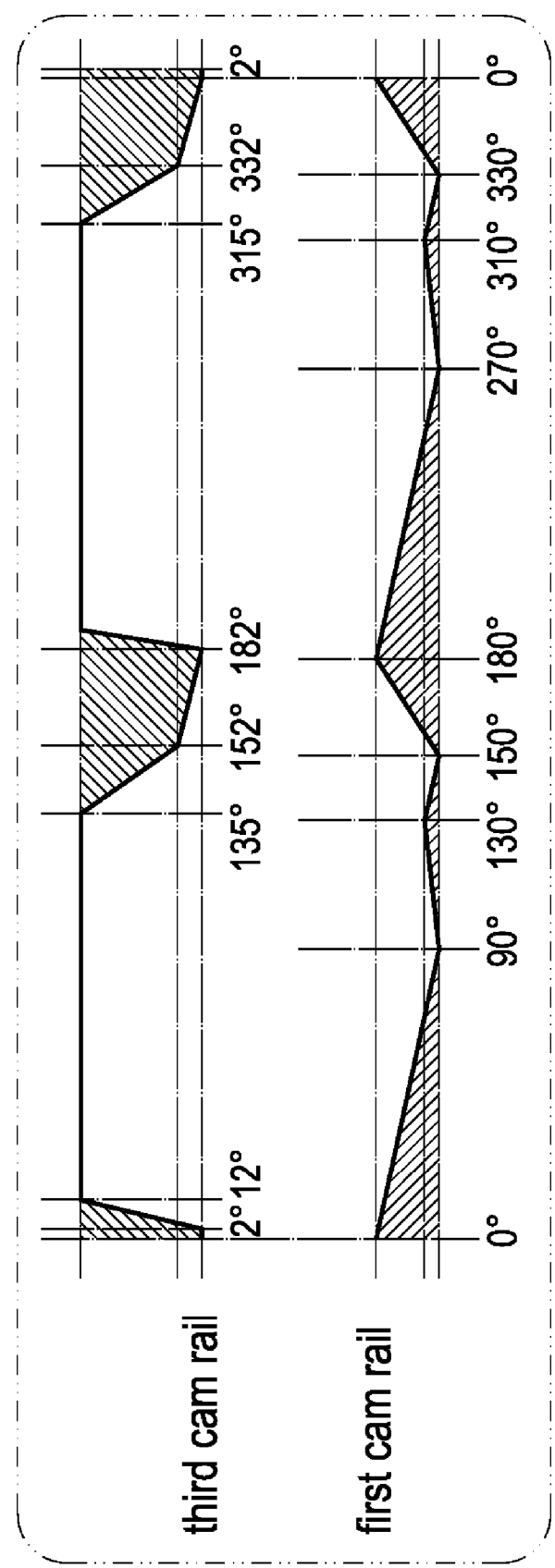
FIG. 2 is an exploded view showing the relationship of the rotation between the rail peaks and rail troughs of the first cam rail of the sliding wheel seat of the present invention.

The pressing-and-controlling means 2 comprises the following components. A shaft rod 21 penetrates through the braking means 3, rotating means 4 and the reciprocating means 5. The end portion of the shaft rod 21 has a flat head 212 formed into a regular polygon. The flat head 212 is provided with a hole 211 thereon. The flat head 212 can be locked into a button 22 and thus prohibited from any radial rotation. The middle portion of the shaft rod 21 is provided with a two-step positioning notch for locking a braking element 34 and a positioning sleeve 51 penetrating thereon, thereby to only allow the axial movement of the braking element 34 and the positioning sleeve 51. The button 22 is provided at one end of the shaft rod 21. A circular and protruding elastic piece 23 can be pressed to restore elastic kinetics. One end of the button 22 is provided with two connecting ears 221. One side of the root of the connecting ear 221 is provided with oblique guiding edges 222. Two holes 223 are provided on the connecting ears 221. A sliding wheel seat 24 is locked with the button 22. The sliding wheel seat 24 is provided with protruding blocks 241 for locking with each hole 223. The length of the hole 233 is larger than that of the protruding block 241, thereby to allow the corresponding movement of the button 22 and the sliding wheel seat 24. The wall surface of one free end of the sliding wheel seat 24 is provided with two corresponding L-shaped sliding passages 242 of the same type. The surface of the other free end of the sliding wheel seat is provided with a first cam rail 243. The relationship between the rail peaks and rail troughs of the first cam rail and the angle of the outer rail of the rotating element is shown in FIG. 2. The pressing-and-controlling means 2 is fixed into the fixed housing 11. After the assembly is finished, the button 22 protrudes through a through hole 113 at one end of the fixed housing, so that a user can press the button to operate the pressing-and-controlling means.

The braking means 3 and the pressing-and-controlling means 2 are arranged such that the pressing-and-controlling means 2 can drive the braking means 3 and the rotating means 4 to produce a clutching operation involving an automatic opening action and a manual closing action. The braking means 3 comprises a torque spring 31 inserted into the hole 211 of the shaft rod 21. The other end of the torque spring 31 is connected to the positioning hole 323 of a braking disk 32. The outer peripheral wall of the braking disk 32 is provided with two guiding rods 321 inserted into the two L-shaped sliding passages 242 of the sliding wheel seat 24 for abutting against the oblique guiding edges 222 of the button 22 and guiding the rotation thereof. A braking element 34 is disposed to one end of the braking disk 32 via the return spring 33. Further, one end surface of the braking disk 32 is provided with two pin rods 322. One end surface of the braking element 34 is provided with two pinholes 341 for connecting to each pin rod 322. In normal state, the two pin rods 322 elastically abut against the end face of the braking element 34. The other side of the braking element 34 is provided with a second cam rail 342. The braking means 3 is inserted into the sliding wheel seat 24 of the pressing-and-controlling means 2 and operates therein.

Figure 3:
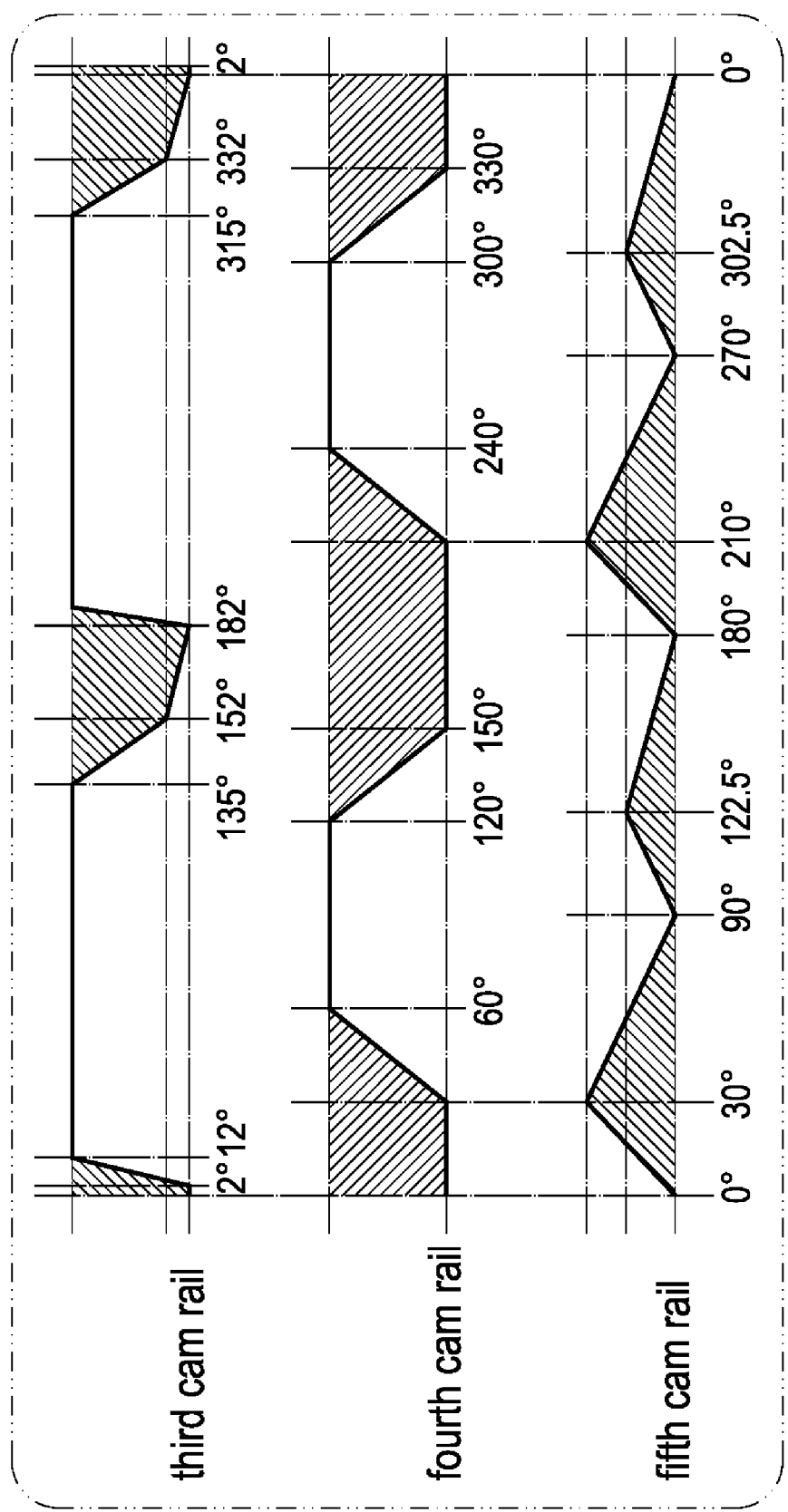
FIG. 3 is an exploded view showing the relationship between the rail peaks and rail troughs of each cam rail of the rotating element of the present invention.

The rotating means 4 is movably and operatively connected to the rear ends of the pressing-and-controlling means 2 and the braking means 2. The rotating means 4 comprises a rotating element 41 and a compression spring 42. The outer periphery of the rotating element 41 is provided with positioning blocks 411. The positioning blocks 411 are two corresponding flanges connected into the grooves on the inner wall of the positioning portions 121 of the rotary housing 12, thereby to generate an action in synchronization therewith. Further, the distal end of a free end of the rotating element 41 is provided with a third cam rail 412. At the fourth cam rail 413 within the third cam rail 412, the third cam rail 412 and the fourth cam rail 413 are provided with at least one rail peak and rail trough alternatively arranged to correspond to the pressing action and the clutch action of the braking means 3, thereby to be in transmission with the first and second cam rails 243, 342 to cause a rotating action (FIG. 2). The rotating element 41 is provided with a fifth cam rail 414 at the distal end of the other free end. The relationship between the arrangement of the rail peaks and rail troughs of the third, fourth and fifth cam rails 412, 413, 414 is shown in FIG. 3.

The reciprocating means 5 is movably connected to the rear end of the rotating means 4. The reciprocating means 5 comprises a positioning sleeve 51 movably abutting against the rear end of the rotating element 41, and a closing spring 52 elastically abutting between the rear end of the positioning sleeve 51 and the inner wall of the fixed housing 12. The outer periphery of the positioning sleeve 51 is provided with two wedges 511 for abutting against the fifth cam rail 414 of the rotating element 41, which can correspond to the closing operation of the mobile phone to move along the fifth cam rail 414 to cause a rotating and closing action.

Figure 4:
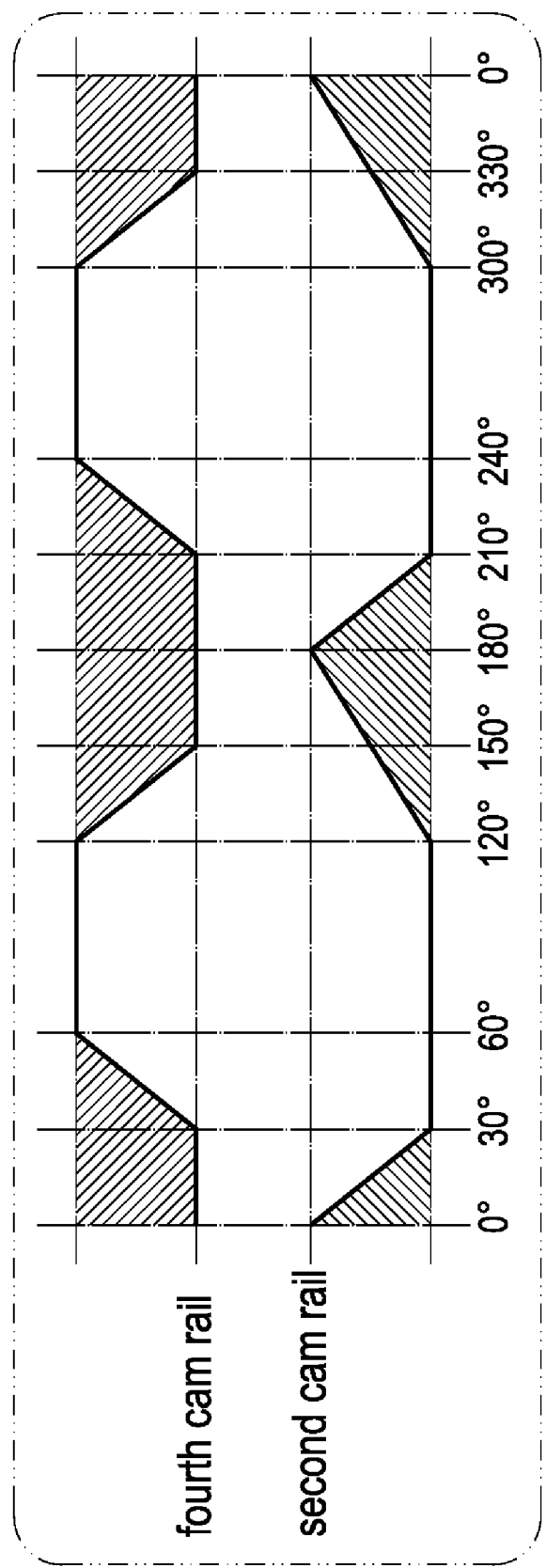
FIG. 4 is an exploded view showing the relationship between the braking element and the fourth cam rail of the rotating element of the present invention.
Figure 6:
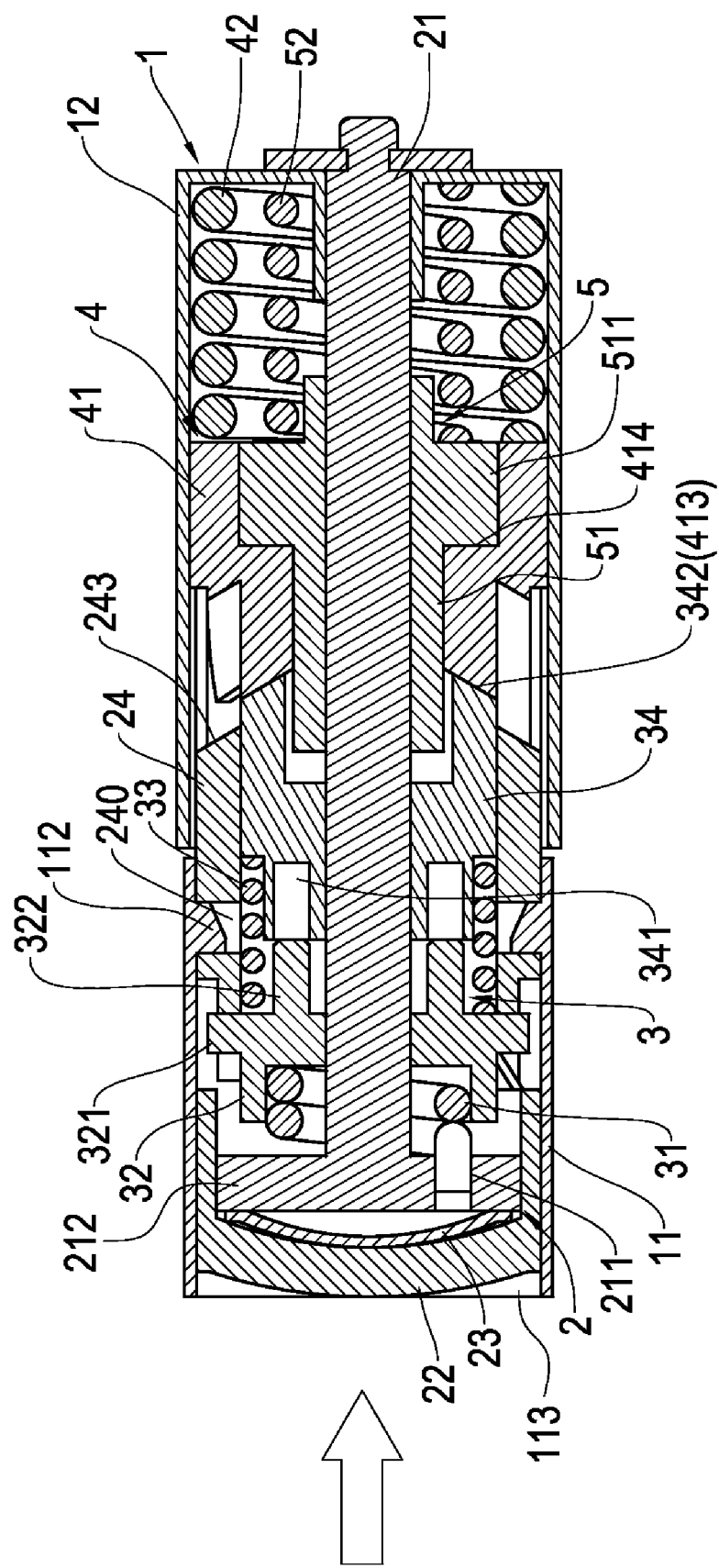
FIG. 6 is an assembled cross-sectional view showing that the braking disk of the present invention rotates a certain angle after the pressing action, so that the pin rod of the braking disk faces to the pinhole in the bottom of the braking element.
Figure 7:
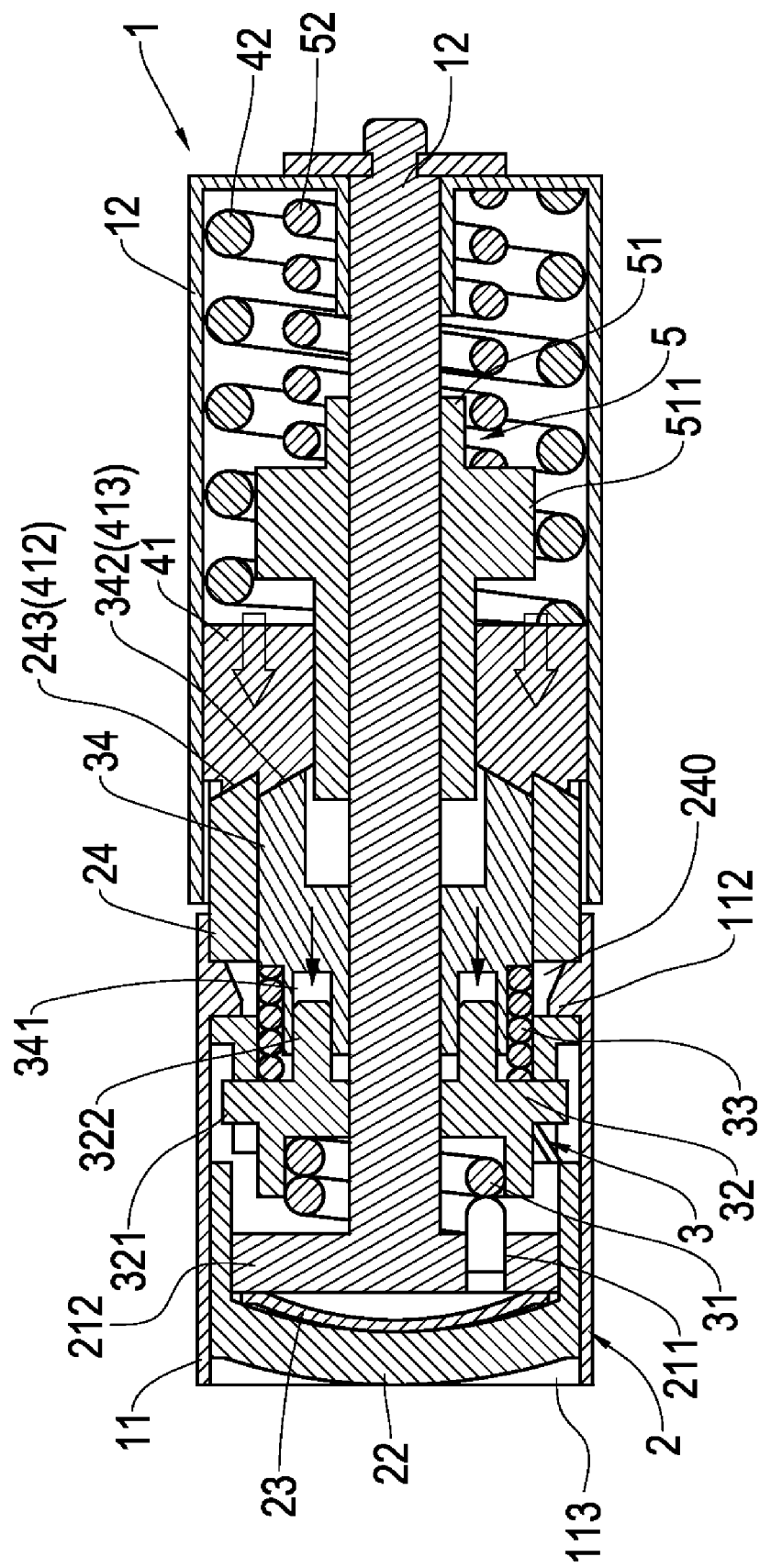
FIG. 7 is an assembled cross-sectional view showing that the pin rod of the braking disk of the present invention slides into the pinhole in the bottom of the braking element, and the rotating element axially moves to be released from the wedge of the positioning sleeve.
Figure 8:
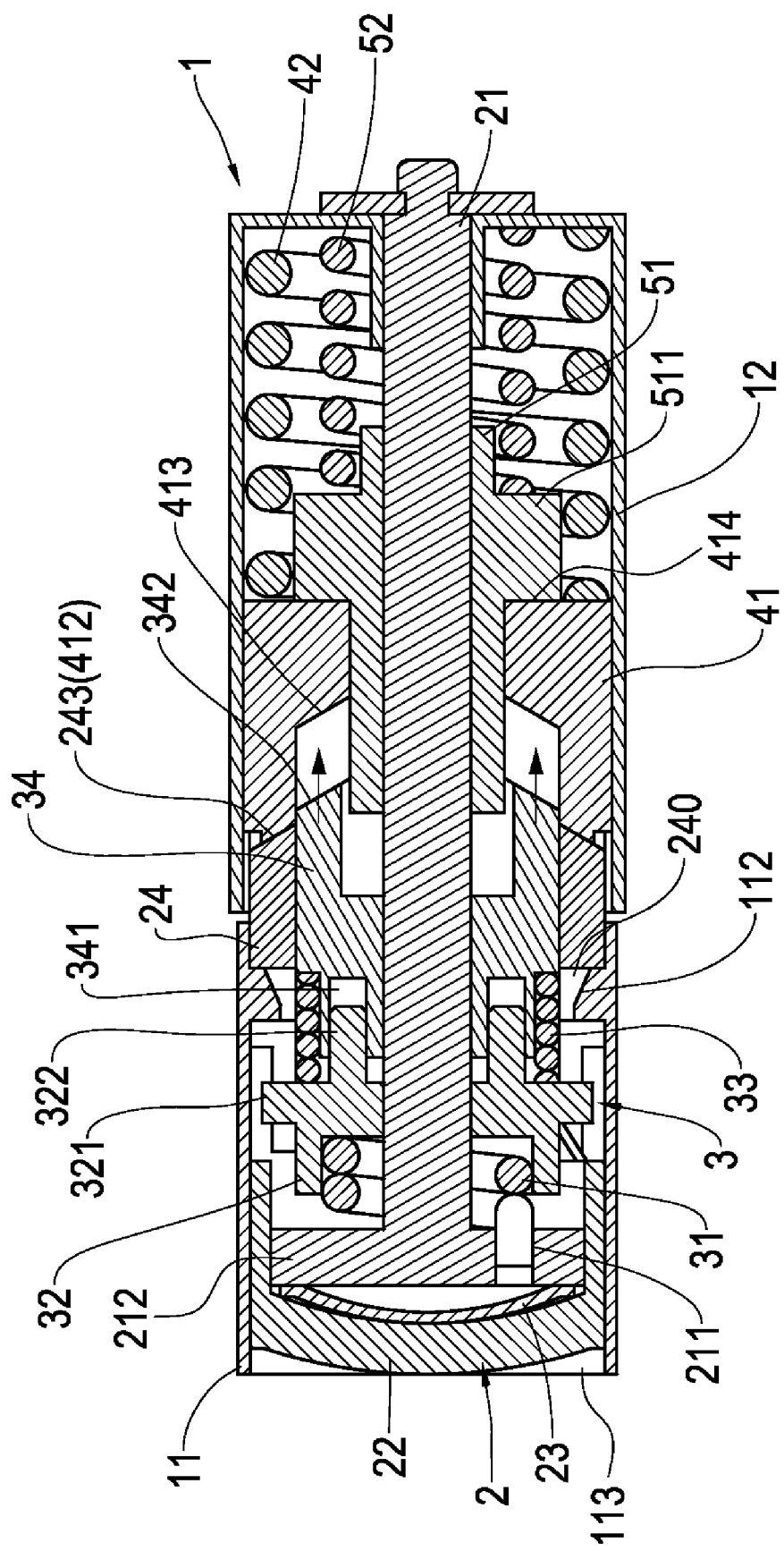
FIG. 8 is an assembled cross-sectional view showing that when the braking element is released from the compression of the fourth cam rail during the lifting stroke of the upper cover of the mobile phone, the return spring of the present invention pushes the pin rod to return its initial position and the braking disk also returns its original position via the torque spring.
Figure 9:
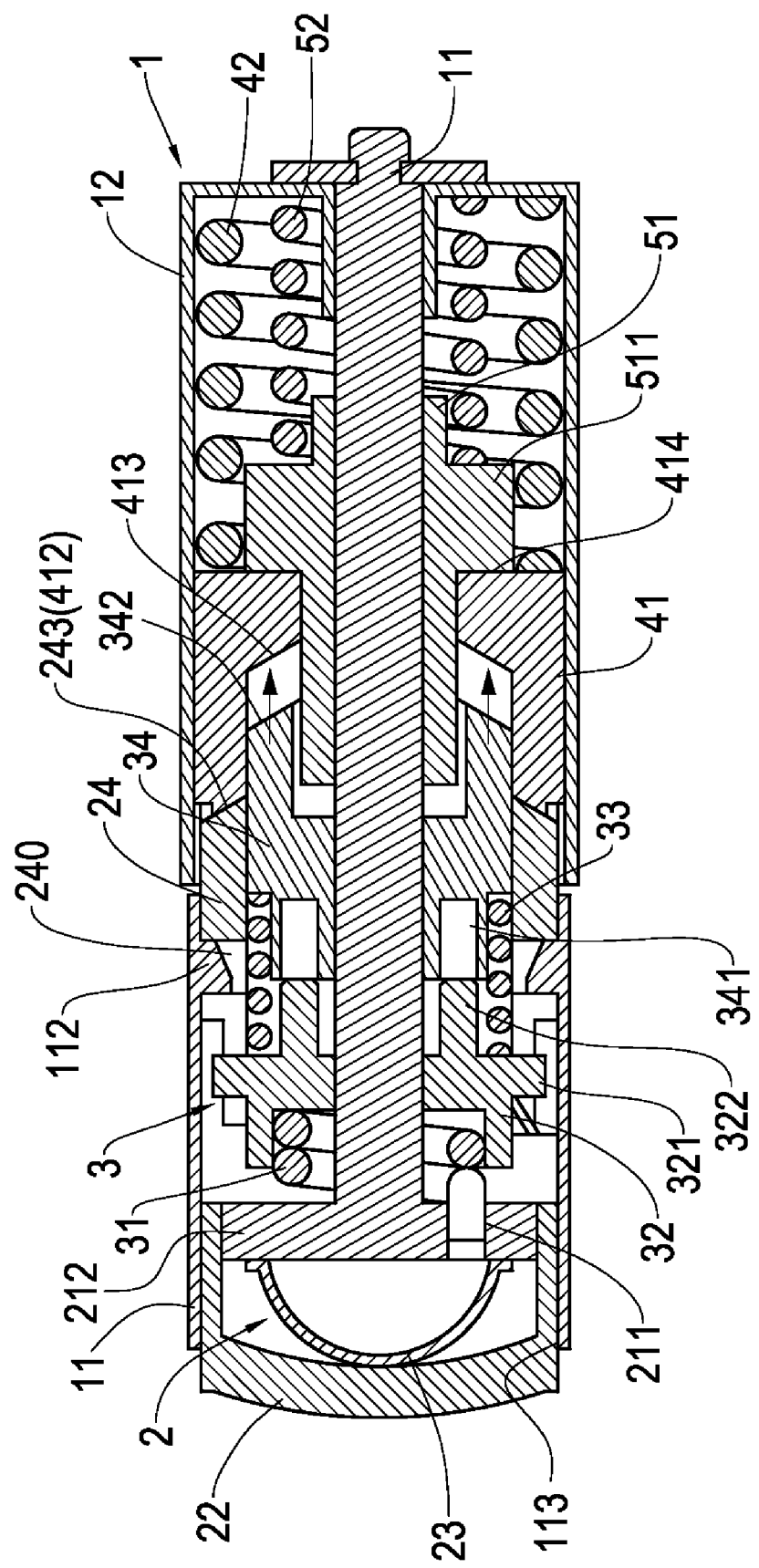
FIG. 9 is an assembled cross-sectional view showing that the compression spring of the present invention extends to rotate the third cam rail of the rotating element so as to abut against the bottom of the rail trough of the first cam rail.

With reference to FIGS. 6 to 9, they are cross-sectional views showing that the present invention is applied to automatically open the mobile phone by a pressing action. In use, the fixed housing 11 and the rotary housing 12 of the housing element 1 are connected between the upper cover and the main body of the mobile phone via its positioning portions 111, 121. The button 22 of the compressing-and-controlling means 2 normally protrudes from the fixed housing 11 by a long distance A. When the mobile phone is in a closed state, the rail peak of the second cam rail 342 of the braking element 34 protrudes from the outside of the rail peak of the first cam rail 243 of the sliding wheel seat 24. The protruding length is identical to the length of the pin rod 322 or that of both wedges 511 of the positioning sleeve 51. At this position, the rail peaks of the second cam rail 342 abut against the rail peaks of the fourth cam peak 413 within the rotating element 41 again. As shown in FIG. 4, when the user presses the button 22 of the pressing-and-controlling means 2, the pressing action causes the connecting ears 221 to axially move and pushes both guiding rods 321 of the braking disk 31 of the braking means 3 via oblique guiding edges 222, thereby to cause a rotating action within two L-shaped sliding passages 242 of the sliding wheel seat 24 and synchronously cause the torque spring 31 to generate an elastic energy. The rotation of the braking disk 31 makes both pin rods 322 thereof to insert into the pinholes 341 of the braking element 34. As shown in FIGS. 6 and 7, the braking element 34 can be retracted into the interior of the sliding wheel seat 24. At this time, the spring force of the compression spring 42 of the rotating means 4 is larger than that of the return spring 33 of the braking means 3, thereby to push the rotating element 41 to press into the braking element 34. Then, the slope of the rail peak of the third cam rail 412 slides obliquely and in parallel to the slope of the rail peak of the first cam rail 243. At this time, the compression spring 42 is expanded due to the rapid reduction in the applied force, so that the instantaneous elastic force urges the third cam rail 412 to rotate along the first cam rail 243 of the sliding wheel seat 24 until the rail peaks and rail troughs of these two cam rails abut against each other. In this way, the action of automatically lifting the upper cover of the mobile phone can be completed. At this time, the rail troughs of the fourth cam rail 413 of the rotating element 41 faces the second cam rail 342 of the braking element 34, so that the return spring 33 pushes the braking element 34 out again while the torque spring 31 forces the braking disk 32 to return its original angle. At this time, the pin rod 322 is removed from two pinholes 341 again to abut against the braking element 34 to its original position. As shown in FIGS. 8 and 9, in this way, the user can rapidly operate the compressing-and-controlling means 2 by single hand, thereby to rapidly and automatically lift the movable end (upper cover) of the mobile phone. Therefore, it is very convenient for the user to answer the call.

Figure 10:
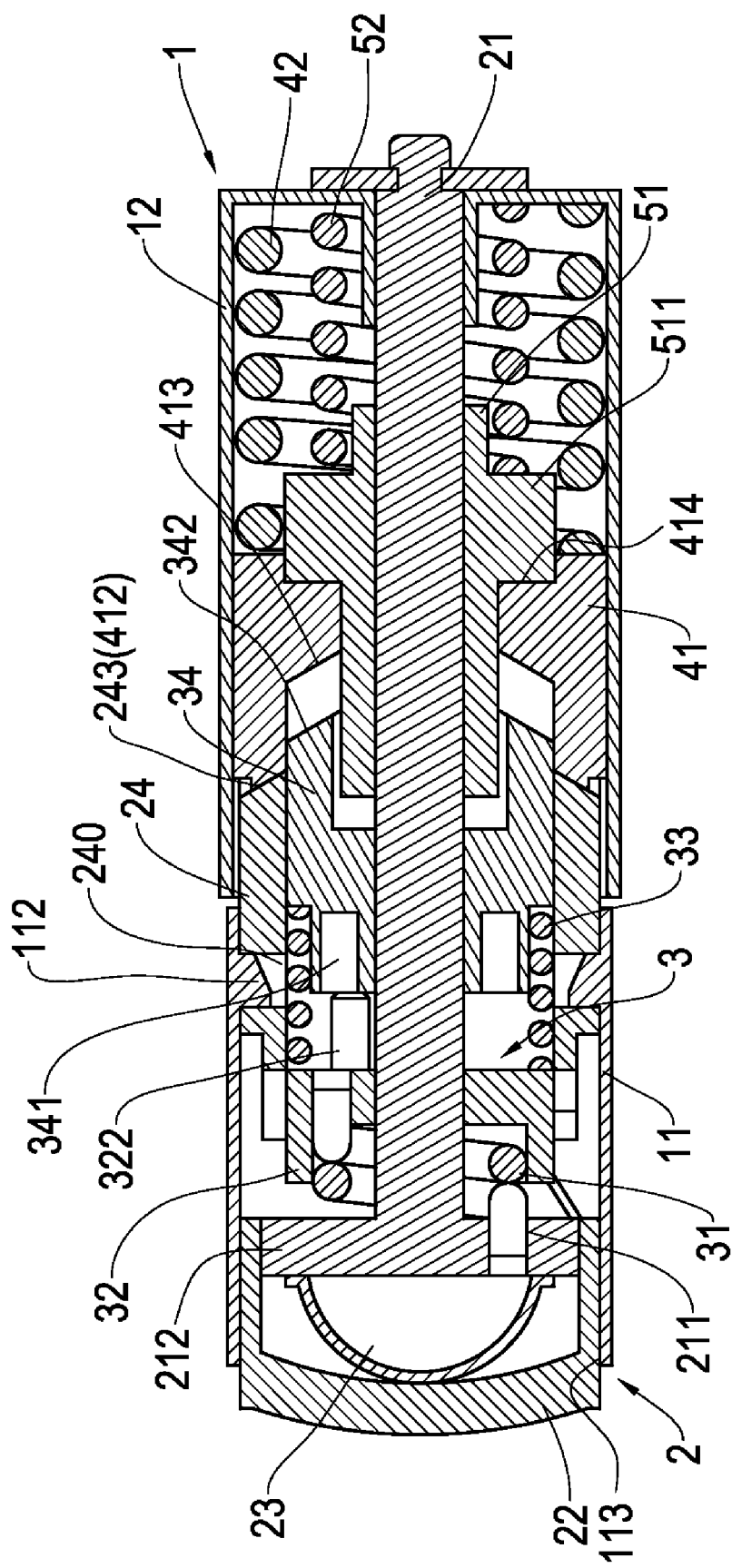
FIG. 10 is a schematic view showing a first action in which a manual closing operation is performed after the automatic opening of the present invention.
Figure 11:
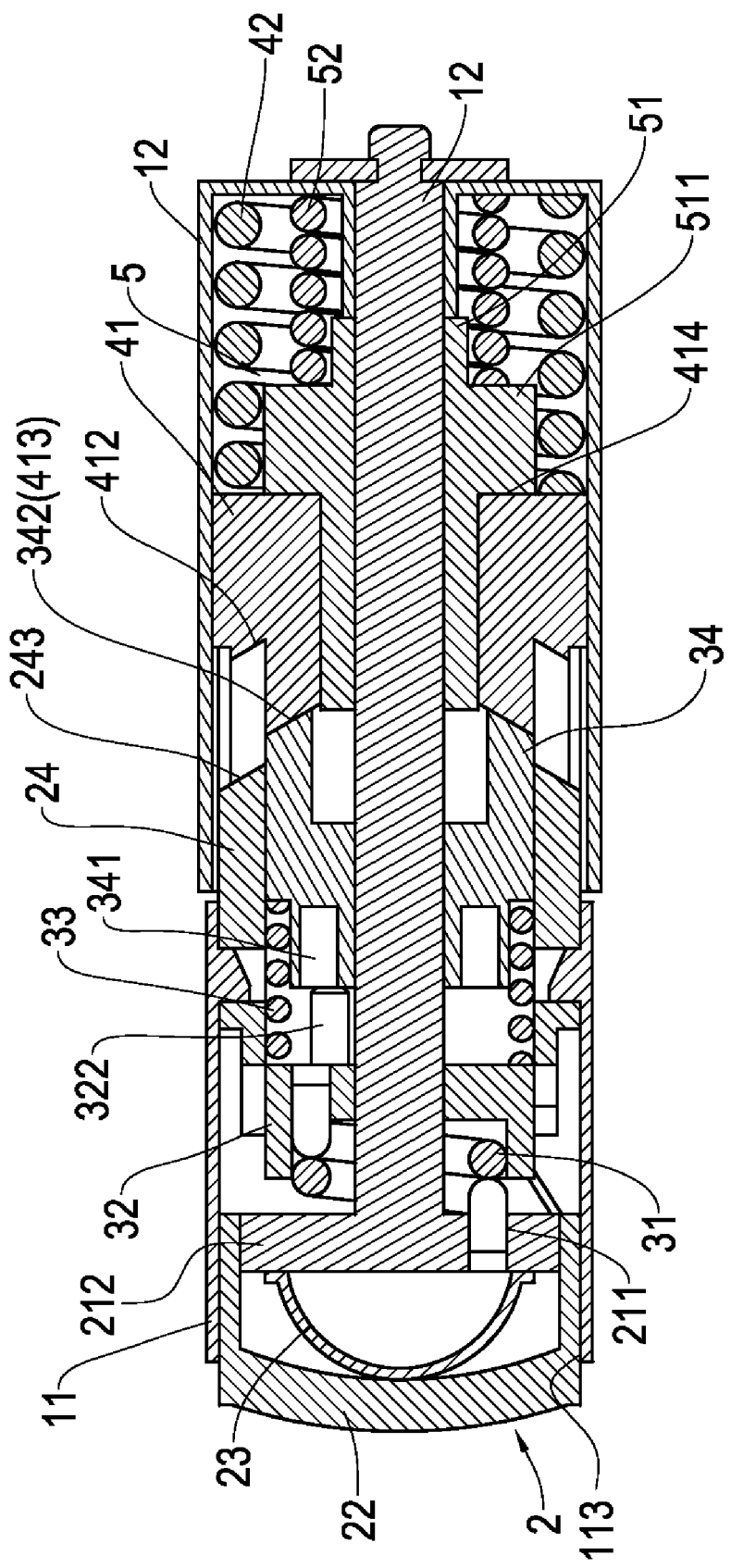
FIG. 11 is a schematic view showing a second action in which a manual closing operation is performed after the automatic opening of the present invention.
Figure 12:
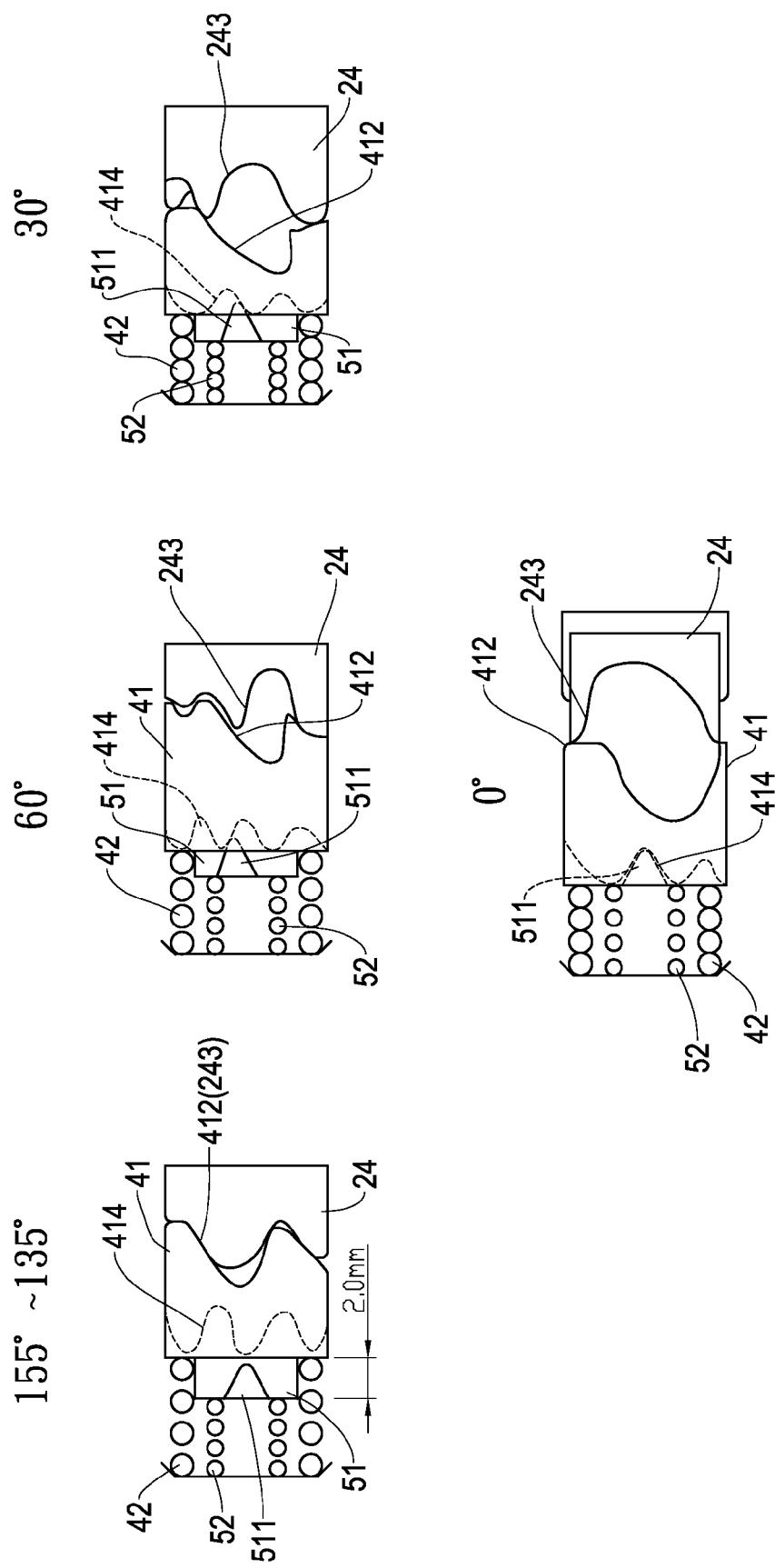
FIG. 12 is a schematic view showing the relationship between the rail peaks and rail troughs of each cam rail in the actions shown in FIG. 10 and FIG. 11.

With reference to FIGS. 10 to 12, when the upper cover of the mobile phone is manually closed toward the main body, the rail peaks and rail troughs of the third cam rail 412 of the rotating element 41 and the first cam rail 243 of the sliding wheel seat 24 abut against each other. The positioning portion 121 of the fixed housing 12 will drive the rotating element 41 due to the closing operation. At this time, the rail peaks of the third cam rail 412 rotate along the first cam rail 243 and press the compression spring 42 toward the left. When the relation between the third cam rail and the first cam rail achieves a certain angle, at this time, the fourth cam rail 413 of the rotating element 41 contacts with the second cam rail 342 of the projecting braking element 34, and then presses and rotates toward the left along the following rail. At this time, the troughs of the fifth cam rail 414 of the rotating element 41 also abut against the tops of both wedges 511 of the positioning sleeve 51 of the reciprocating means 5, as shown in FIG. 10. When the user continues to close the upper cover of the mobile phone, the applied force should overcome the troughs of the fifth cam rail 414 to push the two wedges 511 to the left to compress the closing spring 52, as shown in FIG. 11, and will instantaneously close the upper cover of the mobile phone after it goes beyond the peaks of the two wedges 511.

Figure 5:
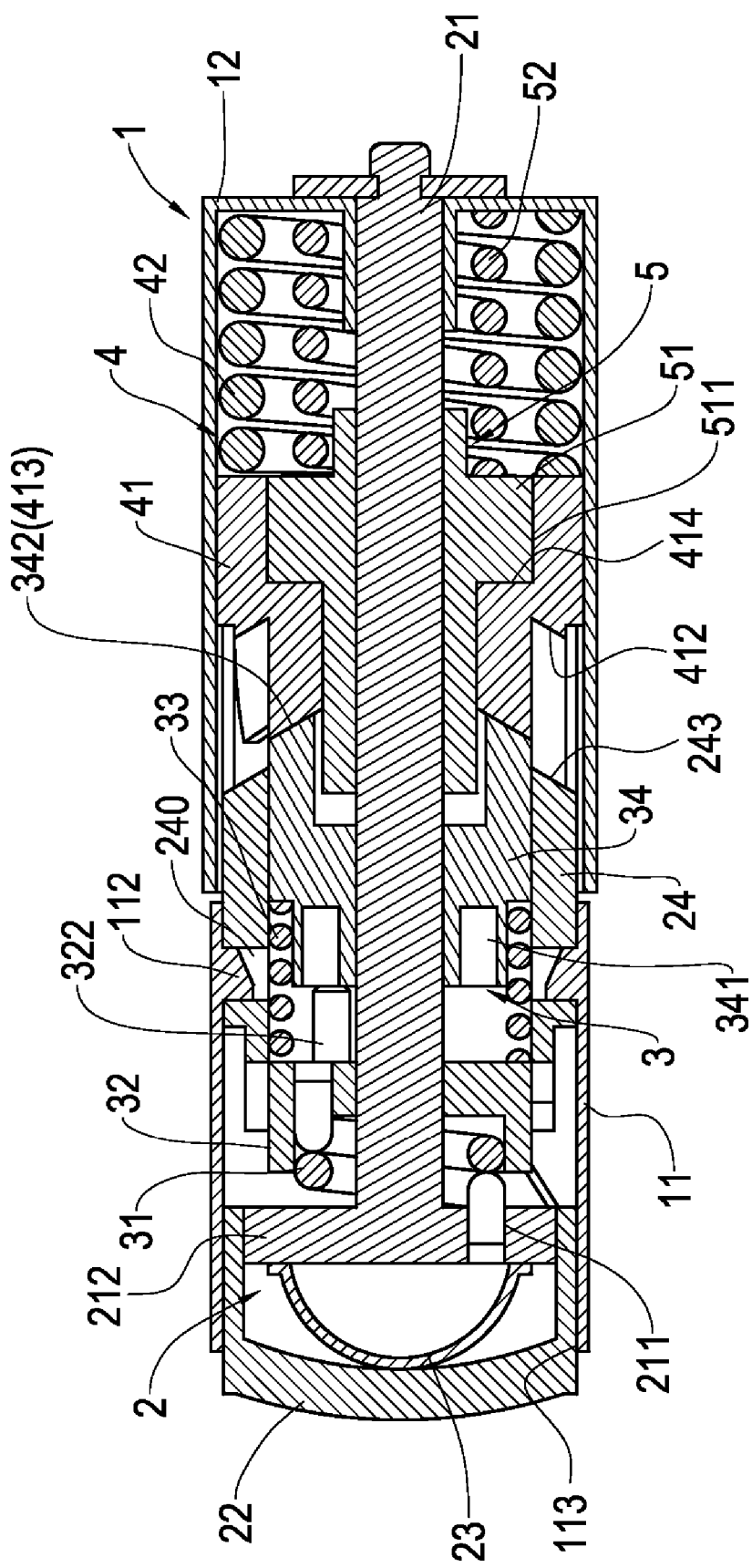
FIG. 5 is an assembled cross-sectional view showing that the peak surfaces of the second and fourth cam rails of the present invention abut against each other, and the pin rod of the braking disk abuts against the bottom of the braking element.

At this time, the peaks of the two wedges 511 are locked into the troughs of the fifth cam rail 414 of the rotating element 41 while the compression spring 42 is compressed to the largest extent. Further, the rail peaks of the fourth cam rail 413 of the rotating element 41 tightly abut against the rail peaks of the second cam rail 342 of the braking element 34. At this time, the upper cover is tightly closed on the main body to wait for the next stat-up operation, as shown in FIG. 5.

Figure 13:
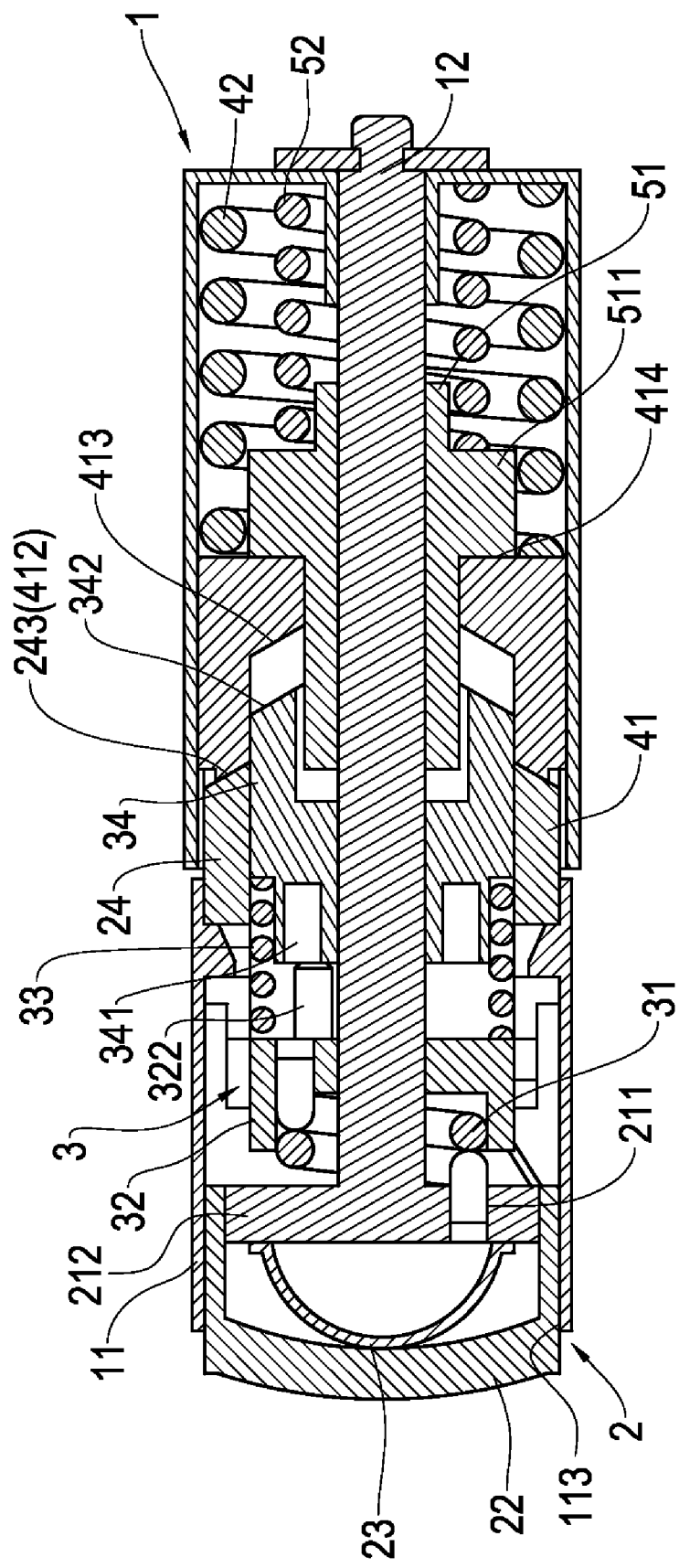
FIG. 13 is a schematic view showing the state in which the automatic opening of the present invention is completed.

With reference to FIG. 11 and FIG. 13 again, they are cross-sectional views showing that the present invention is applied to manually open the mobile phone. When the user manually lifts the upper cover from the main body of the mobile phone, if the applied force is insufficient for making the wedges 511 to go beyond the rail peaks of the fifth cam rail 414 of the rotating element 41, it will automatically return to a closed state. On the contrary, if the applied force is large enough to open the mobile phone, the two wedges 511 of the positioning sleeve 51 can move between the rail peaks and the rail troughs of the fifth cam rail 414 of the rotating element 41, so that the rotating element 41 can rotate to push the positioning sleeve 51 backward to compress the closing spring 52. When the upper cover is lifted to a predetermined angle (preferably, 30 to 70 degrees) relative to the main body, the top of both wedges 511 of the positioning sleeve 51 will be detached from the highest peak of the fifth cam rail 414 of the rotating element 41, as shown in FIG. 11. At this time, the fourth cam rail 413 of the rotating element 41 does not contact with the second cam rail 342 of the braking element 34 and slides downwardly (FIG. 4). At this time, the compression spring 42 is released to push the rotating element 41 to rotate to the left. When it rotates to a certain angle, the rail peaks of the third cam rail 412 of the rotating element 41 contact with the first cam rail 243 of the sliding wheel seat 24 again, and rotate and slide along its rail until the rail peaks contact with the rail troughs. At this time, the upper cover of the mobile phone has been lifted with a manual mode, as shown in FIG. 13.

On the other hand, the user manually closes the upper cover and the main body in the same manner as that shown in FIGS. 10 to 12. Therefore, in a repeat way, the user can manually operate or close the mobile phone and thus it is convenient to answer a call.

Figure 14:
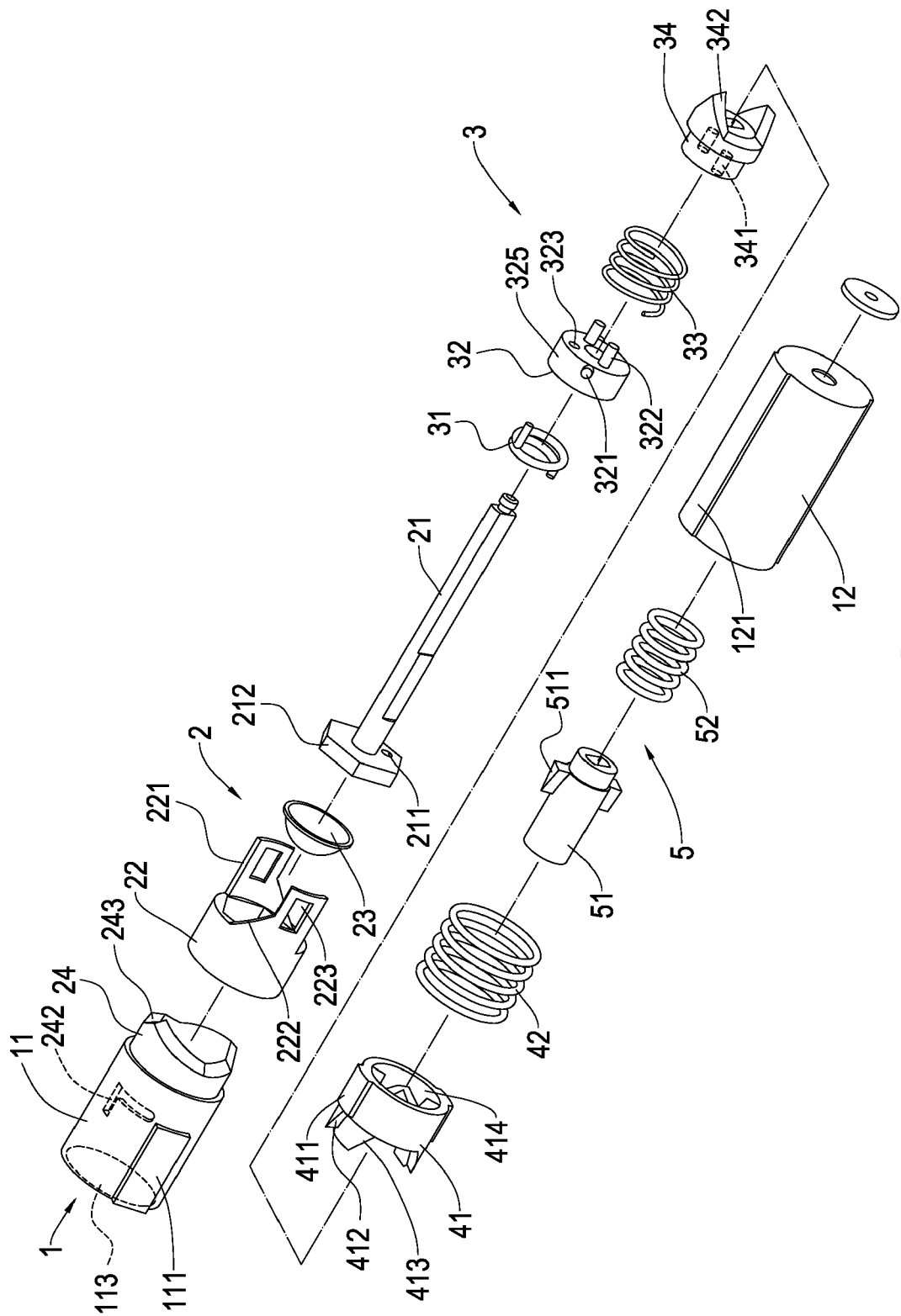
FIG. 14 is an exploded perspective view showing another embodiment of the present invention.

In the above embodiment, the fixed housing 11 of the housing member 1 is configured to be separate from the sliding wheel seat 24 of the pressing-and-controlling means 2. In addition, they can be integrally formed into a single unit in the present embodiment. As shown in FIG. 14, the inner end face of the fixed housing 11 is formed with the sliding wheel seat 24 and the first cam rail 243, and the interior of the fixed housing 11 is formed with L-shaped sliding passages 242, thereby to reduce the expense of molds and simplify the element management.

Although the present invention has been described with reference to the foregoing preferred embodiments, it will be understood that the invention is not limited to the details thereof. Various equivalent variations and modifications can still be occurred to those skilled in this art in view of the teachings of the present invention. Thus, all such variations and equivalent modifications are also embraced within the scope of the invention as defined in the appended claims.

What is claimed is:

1. A device for automatically lifting a cover of a mobile phone by pressing, comprising:
   a pressing-and-controlling means having a shaft rod and a sliding wheel seat, one end of the sliding wheel seat formed with a first cam rail;

a braking means having a braking disk connected onto the shaft rod with a predetermined elastic torque therebetween, a braking element sequentially connected onto the shaft rod for axially moving relative to the shaft rod, and a return spring provided between the corresponding end faces of the braking disk and the braking element, the braking disk, the braking element and the return spring accommodated within the sliding wheel seat, the other end of the braking element formed with a second cam rail;

a rotating means comprising a rotating element and a compression spring abutting against one end face of the rotating element, the rotating element provided with a third cam rail and a fourth cam rail at an end corresponding to the first cam rail and the second cam rail, respectively, each of the above cam rails operatively connected to one another, the other end of the rotating element provided with a fifth cam rail; and a reciprocating means having a positioning sleeve connected onto the shaft rod and axially movable relative to the shaft rod and a closing spring abutting against one end of the positioning sleeve, one end of the positioning sleeve accommodated into the rotating element, the periphery of the other end thereof provided with wedges, the wedges operatively connected to the fifth cam rail.

2. The device for automatically lifting a cover of a mobile phone by pressing according to claim 1, further comprising a housing member, the housing member comprising a pair of fixed housing and rotary housing connected to the outside of the pressing-and-controlling means, braking means, rotating means and the reciprocating means.

3. The device for automatically lifting a cover of a mobile phone by pressing according to claim 2, wherein the pressing-and-controlling means further comprises a button and a circular protruding elastic piece, the button is provided at one end of the shaft rod and connected onto the sliding wheel seat, the shaft rod has a flat head, and the circular protruding elastic piece is sandwiched between the flat head and the button.

4. The device for automatically lifting a cover of a mobile phone by pressing according to claim 3, wherein the button has two connecting ears corresponding to each other, each connecting ear is provided with a hole thereon, and the sliding wheel seat is provided with two blocks for locking with the holes.

5. The device for automatically lifting a cover of a mobile phone by pressing according to claim 3, wherein an outer peripheral surface of the sliding wheel seat is further provided with two locking troughs, an inner wall of the fixed housing is provided with two positioning blocks, and the positioning blocks are correspondingly locked with the sliding wheel seat.

6. The device for automatically lifting a cover of a mobile phone by pressing according to claim 3, wherein the braking means further comprises a torque spring connected onto the shaft rod, the flat head of the shaft rod and the end face of the braking disk are provided with a hole and a positioning hole to allow the insertion and connection of the torque spring.

7. The device for automatically lifting a cover of a mobile phone by pressing according to claim 4, wherein an outer peripheral wall of the braking disk is provided with two guiding rods, one end of the sliding wheel seat away from the first cam rail is provided with two L-shaped sliding passages corresponding to each other, a root of the connecting ear of the button is provided with oblique guiding edges for the abutting each guiding rod during the sliding movement of each sliding movement within the sliding passage.

8. The device for automatically lifting a cover of a mobile phone by pressing according to claim 1, wherein the braking disk is provided with two pin rods to correspond to the end face of the braking element, the end face of the braking element is provided with two pinholes to allow the operative insertion and connection of each pin rod.

9. The device for automatically lifting a cover of a mobile phone by pressing according to claim 2, wherein an outer peripheral wall of the rotating element of the rotating means is provided with two positioning blocks, an inner wall of the rotary housing is formed with two groove positioning portions corresponding to each other, and the positioning portions allow the insertion and connection of the positioning blocks.

10. The device for automatically lifting a cover of a mobile phone by pressing according to claim 1, wherein a compression force of the return spring of the braking means is smaller than that of the compression spring of the rotating means.

* * * * *